United States Patent
Al Ghossein et al.

(10) Patent No.: US 11,967,805 B2
(45) Date of Patent: Apr. 23, 2024

(54) FORMED WIRE INLAY TOOL

(71) Applicant: Hubbell Incorporated, Shelton, CT (US)

(72) Inventors: Rabih M. Al Ghossein, Hoover, AL (US); Adrian Beau Candelaria, Montevallo, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 578 days.

(21) Appl. No.: 17/021,944

(22) Filed: Sep. 15, 2020

(65) Prior Publication Data
US 2021/0091545 A1    Mar. 25, 2021

Related U.S. Application Data

(60) Provisional application No. 62/904,973, filed on Sep. 24, 2019.

(51) Int. Cl.
| | | |
|---|---|---|
| H02G 1/04 | (2006.01) | |
| H01R 43/033 | (2006.01) | |
| H02G 7/05 | (2006.01) | |

(52) U.S. Cl.
CPC ............ *H02G 1/04* (2013.01); *H01R 43/033* (2013.01); *H02G 7/056* (2013.01)

(58) Field of Classification Search
CPC ........ H02G 1/04; H02G 7/056; H02G 1/1292; H02G 1/1297; H02G 1/16; D07B 3/14; D07B 7/182; B29C 53/821; B29C 53/58; B29C 53/562; B29C 53/14; F16G 11/146; B21F 15/04; B21F 17/00; E04H 17/268; E04H 17/266; H01R 43/033; H01R 43/0335

USPC ................................................. 254/134.3 R
See application file for complete search history.

(56) References Cited

U.S. PATENT DOCUMENTS

| | | | | |
|---|---|---|---|---|
| 861,283 A | * | 7/1907 | Hjorth | ................ H01R 43/033 140/123 |
| 1,080,472 A | | 12/1913 | Parker | |
| 1,180,507 A | * | 4/1916 | Kortick | .................. B21F 15/04 140/117 |
| 1,340,029 A | * | 5/1920 | Fachman | ................ B21F 15/04 140/122 |
| 1,504,087 A | | 1/1924 | Roy | |
| 2,146,575 A | | 2/1939 | Max | |
| 2,220,203 A | | 11/1940 | Branin | |

(Continued)

OTHER PUBLICATIONS

Hubbell ADSS Communication Hardware Brochure, Mar. 2016 (16pgs).

(Continued)

*Primary Examiner* — Tyrone V Hall, Jr.
(74) *Attorney, Agent, or Firm* — Wissing Miller LLP (57) ABSTRACT

A tool for wrapping a formed wire around a cable is provided. The tool includes a handle portion and a head portion. The handle portion has an elongated body and a hand grip portion attached to the elongated body. The head portion has a cover pivotably attached to a base. When the cover is pivoted into contact with the base a cable receiving opening is formed between the cover and the base. The head portion also includes a pusher member extending from the cover or the base into the cable receiving opening. The pusher member is adapted to contact and push strands of a formed wire when the tool is in use.

25 Claims, 10 Drawing Sheets

(56) References Cited

U.S. PATENT DOCUMENTS

| | | | | |
|---|---|---|---|---|
| 2,605,661 A | * | 8/1952 | Heuer | H01R 11/15 439/477 |
| 2,774,392 A | * | 12/1956 | Corne | B21F 15/00 140/124 |
| 2,902,759 A | * | 9/1959 | Miller | H02G 1/1297 30/90.2 |
| 3,077,211 A | * | 2/1963 | Brooks | H01R 43/033 242/439.1 |
| 3,572,189 A | * | 3/1971 | Matthews | H02G 1/1226 30/90.1 |
| 4,407,337 A | * | 10/1983 | Hines | H01R 43/033 140/124 |
| 4,407,471 A | | 10/1983 | Wilmsmann | |
| 4,770,491 A | | 9/1988 | Champa | |
| 5,358,206 A | | 10/1994 | Pittella | |
| 5,369,849 A | | 12/1994 | DeFrance | |
| 5,539,961 A | | 7/1996 | DeFrance | |
| 5,615,965 A | | 4/1997 | Saurat | |
| 5,647,046 A | | 7/1997 | Cowen | |
| 5,758,005 A | | 5/1998 | Yoshida | |
| 6,076,236 A | | 6/2000 | DeFrance | |
| 6,173,104 B1 | | 1/2001 | Polidori | |
| 6,389,213 B1 | | 5/2002 | Quesnel | |
| 6,547,481 B2 | | 4/2003 | Grabenstetter | |
| 6,796,854 B2 | | 9/2004 | Mello | |
| 6,817,909 B2 | | 11/2004 | Dobrinski | |
| 6,957,807 B2 | | 10/2005 | Zimmer | |
| 7,039,988 B2 | | 5/2006 | DeFrance | |
| 7,891,060 B2 | | 2/2011 | Ross | |
| 8,336,684 B2 | | 12/2012 | Bantle | |
| 8,984,722 B2 | | 3/2015 | Shibilia | |
| 9,929,555 B2 | | 3/2018 | Shibilia | |
| 2002/0173206 A1 | | 11/2002 | Dobrinski | |

OTHER PUBLICATIONS

PLP Fiberlign Lite Tension Dead-end Brochure, Jun. 2011 (4pgs).
PLP Fiberlign ADSS Drop Cable Dead-end Brochure, 2009 (2pgs).
PLP Application Procedure & Safety Considerations, Fiberlign ADSS Drop Cable Dead-end Brochure, Feb. 2004 (2pgs).
AFL Limited Tension Formed Wire Dead End for ADSS Cable, 2002 (3pgs).
AFL AFL FIT (Formed Wire Installation Tool), Aug. 31, 2011 (1pg).
AB Chance Single SuperLock Clamp Installation Instructions_1973 (4pgs).

* cited by examiner

FORMED WIRE INLAY TOOL

CROSS REFERENCE TO RELATED APPLICATIONS

The present disclosure is based on and claims benefit from U.S. Provisional Patent Application Ser. No. 62/904,973 filed on Sep. 24, 2019 entitled "Formed Wire Inlay Tool" the contents of which are incorporated herein in their entirety by reference.

BACKGROUND

Field

The present disclosure relates to tools for attaching a formed wire to a cable and/or conductor. More particularly, the present disclosure relates to tools for wrapping formed wires around cables and/or conductors.

Description of the Related Art

Aerial electrical conductors and communication cabling is typically strung from utility pole to utility pole, or from a utility pole to a building. One method for securing the cable to the utility pole so that the cable can withstand cable sag and environmental conditions is by using a formed wire dead-end. Aerial electrical conductors may be spliced using a formed wire.

A formed wire is a is a steel wire that is pre-formed with a spiral or helical shape so that it can be wrapped around an electrical conductor, communication cable, messenger cable or a support cable. Formed wire may be used to lash an electrical conductor, communication cable, messenger cable or a support cable to a structure, which is known as a formed wire dead-end attachment. Formed wires may also be used as a splice attachment to join two electrical conductors or support cables together. The formed wire effectively transfers an axial load on the electrical conductor, communication cable, messenger cable or support cable to a low uniform radial compression force. This transition of force is distributed over the length of the formed wire thus allowing the formed wire to securely hold the electrical conductor, communication cable, messenger cable or support cable with minimum pressure on the electrical conductor, communication cable, messenger cable or a support cable so as not to degrade the operational capability of the electrical conductor, communication cable, messenger cable or a support cable.

Typically, when trying to wrap the free end or ends of the formed wire around an electrical conductor, communication cable or a support cable the stiffness of the steel makes it difficult to make the last few wraps by hand leaving installers to find creative ways to make the last few wraps. Therefore, a need exists for a tool that can be used to make the last few wraps of a formed wire around an electrical conductor, communication cable or a support cable.

SUMMARY

The present disclosure provides embodiments of tools for wrapping formed wires around cables. In one exemplary embodiment, the tool includes a handle portion and a head portion. The handle portion includes an elongated body and a hand grip portion attached to at least a portion of the elongated body. The head portion includes a base, a cover and a locking system. The base is attached to the elongated body of the handle portion and includes a pusher member adapted to contact and push one or more strands of a formed wire when the tool is in use. The cover is removably coupled to the base by a pin. The pin forms a pivot point between the cover and the base so that the cover is movable relative to the base. The locking system is adapted to releasably hold the cover to the base when the tool is in use. The locking system may be any suitable system or mechanism that can releasably hold the cover to the base. In an exemplary embodiment, the locking system includes a clasp on the cover and a clasp holder on the base that is adapted to receive the clasp and releasably hold the clasp.

In another exemplary embodiment, the tool includes a handle portion, a head portion and a pusher member. The handle portion has an elongated body and a hand grip portion attached to at least a portion of the elongated body. The head portion has a cover pivotably attached to a base so that when the cover is pivoted into contact with the base a cable receiving opening is formed between the cover and the base. The pusher member extends from the cover or the base into the cable receiving opening. The pusher member is adapted to contact and push strands of a formed wire when the tool is in use. The tool in this exemplary embodiment may also include a locking system that is adapted to releasably hold the cover to the base when the cover is pivoted into contact with the base. The locking system may be any suitable system or mechanism that can releasably hold the cover to the base. In an exemplary embodiment, the locking system includes a clasp on the cover and a clasp holder on the base that is adapted to receive the clasp and releasably hold the clasp.

In another exemplary embodiment, the tool includes a handle portion and a head portion. The handle portion has an elongated body and a hand grip portion attached to at least a portion of the elongated body. The head portion includes a base, a cover and a locking system. The base is attached to the elongated body of the handle portion. The cover is coupled to the base so that the cover is movable relative to the base. The locking system is used to releasably hold the cover in a closed position relative to the base. In this exemplary embodiment, the base or the cover includes a pusher member adapted to contact and push one or more strands of a formed wire when the tool is in use. The locking system may be any suitable system or mechanism that can releasably hold the cover to the base. In an exemplary embodiment, the locking system includes a clasp on the cover and a clasp holder on the base that is adapted to receive the clasp and releasably hold the clasp.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Exemplary embodiments of a tool for wrapping formed wires around cables or conductors for dead-end attachments or splices are shown. As noted above, a formed wire is a spirally formed high strength steel wire. A formed wire used for dead-end attachments has a pair of legs with the preformed spiral shape and a loop portion joining the pair of legs. A formed wire used for splicing is a single linear length of spirally formed high strength steel wire. Formed wires are typically made of strands of steel or galvanized steel. The number of strands of steel depends upon the load the formed wire is to support and may range from about three (3) strands to about seven (7) strands. Each strand may have a diameter in the range of about 0.062 inches to about 0.204 inches.

For ease of description, the cables or conductors described herein may also be referred to as the "cables" in the plural and the "cable" in the singular. Examples of such cables include electrical conductors, messenger cables, communication cables and support cables. Examples of support cables include guy wires. For ease of description, the formed wire dead-end attachments described herein may also be referred to as the "dead-end attachments" in the plural and the "dead-end attachment" in the singular.

The tool according to the present disclosure will be described in relation to the use of a formed wire as a dead-end attachment. Formed wire used for dead-end attachments are known and typically include two legs of spiraled (or helical) wire, where one leg may be longer that the other leg. Each spiral of such formed wire may also be referred to as a pitch. However, the tool may be used for other functions, such as splicing multiple cables. Formed wire used for splicing multiple cables are known and typically include a single leg of spiraled (or helical) wire. Each spiral of such formed wire may also be referred to as a pitch.

Figure 1:
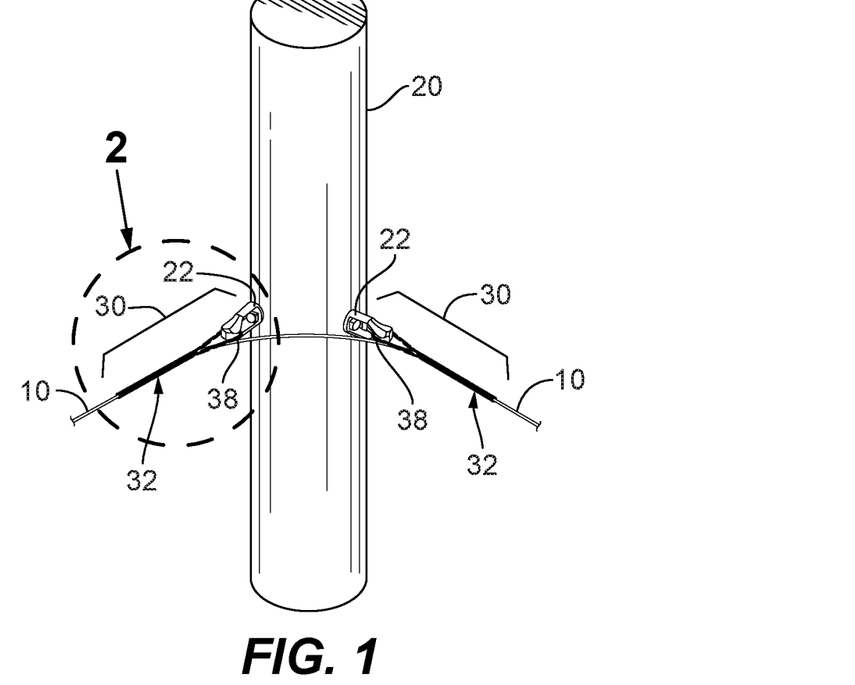
FIG. 1 is top perspective view of an exemplary embodiment of a conductor or cable being attached to a utility pole using two formed wire dead-end attachments.
Figure 2:
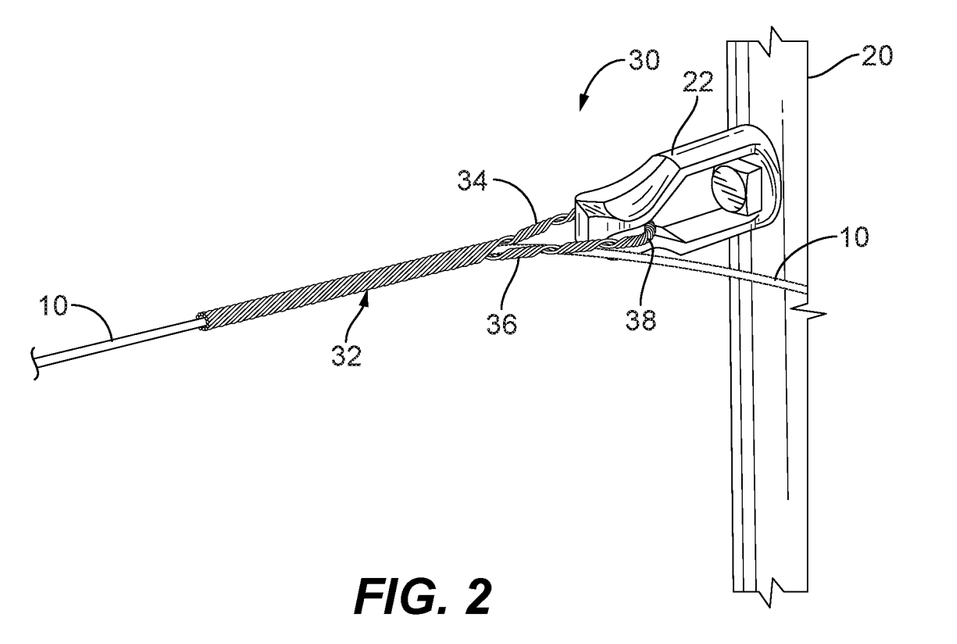
FIG. 2 is a top perspective view of one of the two formed wire dead-end attachments in FIG. 1 taken from detail 2.
Figure 3:
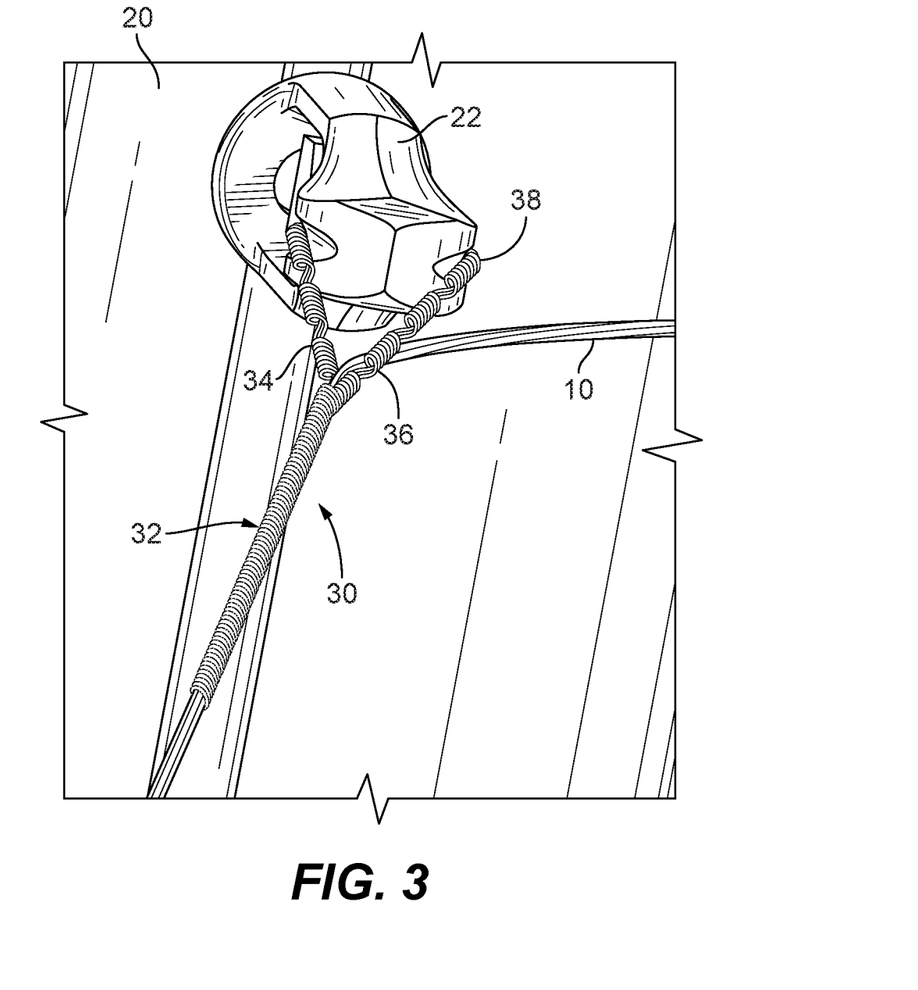
FIG. 3 is an enlarged top perspective view of the formed wire dead-end attachment in FIG. 2.
Figure 4:
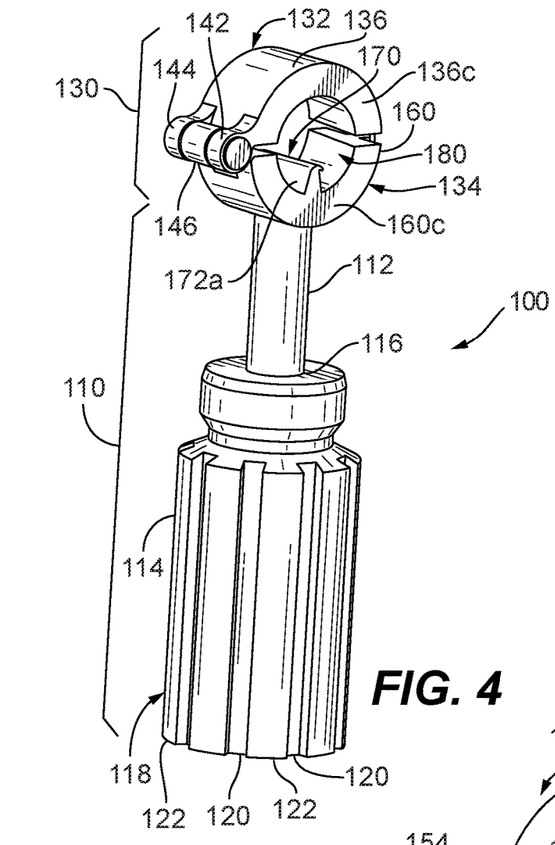
FIG. 4 is a side perspective view of an exemplary embodiment of a tool according to the present disclosure used to wrap a formed wire around a cable according to the present disclosure.
Figure 5:
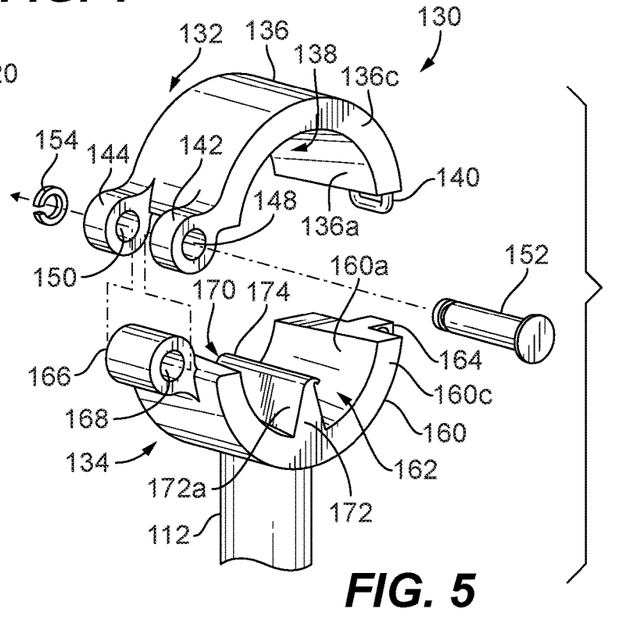
FIG. 5 is an enlarged perspective view of a head portion of the tool of FIG. 4 with parts separated, illustrating a cover releasably coupled to a base with a pin.

Examples of dead-end attachments are shown in FIGS. 1-3. As shown, a cable 10 is attached to a utility pole 20 using dead-end attachments 30. In the embodiment shown in FIGS. 1-3 two dead-end attachments are used to attach the cable 10 to the utility pole 20. Each dead-end attachment 30 includes an eyelet 22 and formed wire 32. Each eyelet 22 is secured to the utility pole 20 using for example a lag bolt (not shown), and each formed wire 32 includes two legs 34 and 36 joined by a looped end 38 that fits within the eyelet 22. As shown, each leg 34 and 36 of the formed wire 32 of each dead-end attachment 30 is wrapped around the cable 10 to effectively transfer axial loads on the cable to a low uniform radial compression force near the looped end 38 of the formed wire 32 to distribute the compression force over the length of the formed wire 32 thus allowing the formed wire 32 to securely hold the cable 10 with minimum pressure on the cable 10.

When wrapping the legs of a formed wire 32 around a cable 10 for a dead-end attachment, the pitches of the spiraled wire of the legs 34 and 36 are aligned at a cross-over point and then each leg 34 and 36 is typically wrapped around the cable 10 by hand until a point is reached where it is difficult to continue to manually wrap the last few pitches of each leg 34 and/or 36 around the cable 10. It is at this point that the tool 100 or 200 according to the present disclosure may be used to complete the wrapping the legs 34 and 36 of the formed wire 32 around the cable 10.

Referring to FIGS. 4-7, an exemplary embodiment of a tool 100 according to the present disclosure is shown. In this exemplary embodiment, the tool 100 includes a handle portion 110 and a head portion 130, seen in FIG. 4. The handle portion 110 includes an elongated body 112 and a hand grip portion 114 attached to at least a portion of the elongated body 112. In this exemplary embodiment, the elongated body 112 is a cylindrical body made of a rigid material, such as a metallic material or a rigid plastic material. Non-limiting examples of metallic materials include steel, aluminum or copper. A non-limiting example of a non-metallic material includes high impact plastic such as polypropylene, acetal, or polystyrene. However, the present disclosure contemplates that the elongated body 112 may come in any other shape, such as a square or rectangular shape. The hand grip portion 114 may also be a cylindrical body with a central bore 116 having a diameter capable of receiving at least a portion of the elongated body 112. However, the present disclosure contemplates that the hand grip portion 114 may come in any other shape with a central bore 116 having an opening capable of receiving at least a portion of the elongated body 112. The hand grip portion 114 may be attached to the elongated body 112 by a press fit, welds or using mechanical or adhesive fasteners. The hand grip portion 114 may include one or more grip enhancing members 118 provided to improve a user's grip on the tool 100 during operation. In the exemplary embodiment shown in FIG. 4, the one or more grip enhancing members 118 include one or more elongated slots 120 extending longitudinally along at least a portion of the length of the hand grip portion 114 forming ribs 122. In other embodiments, the one or more grip enhancing members 118 may include knurling or a rubber or other tactile coating applied to the hand grip portion 114.

Figure 6:
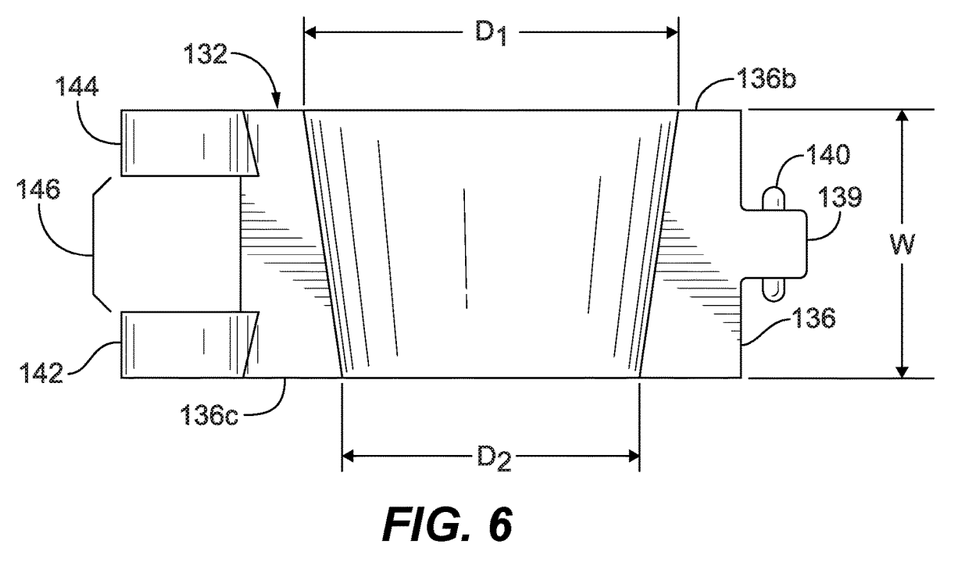
FIG. 6 is a top plan view of the cover of the head portion of the tool of FIG. 5.

The head portion 130 of the tool 100 includes a cover 132 and a base 134. In the embodiment of FIGS. 4-7, the cover 132 may also be referred to as an upper half 132 and the base 134 may also be referred to as a lower half 134. In this exemplary embodiment, the upper half 132 has a C-shaped body 136 defining an opening 138, a clasp mounting bracket 139 extending from a first end of the body 136, a clasp 140 movably attached to the clasp mounting bracket 139 and a pair of pin receiving arms 142 and 144 extending from a second end of the body 136. The second end of the body 136 is preferably opposite the first end of the body. The upper half body 136 has a width "W" that may range from about ¾ of an inch to about 1 inch. In this exemplary embodiment, the body 136 has an arcuate shape wall 136a forming the opening 138 with a radius that is sufficient to receive at least a portion of a cable 10 and a formed wire 32. However, the wall 136a may have other shapes, including, for example, a box-like shape. The wall 136a has a thickness that is tapered from a first side edge 136b of the body 136 to a second side edge 136c of the body, as shown in FIG. 6. This taper in the wall 136a alters the diameter of the opening 138. For example, the diameter "$D_1$" of the opening 138 at the first side edge 136b is preferably larger than the diameter "$D_2$" of the opening 138 at the second side edge 136c. The pair of pin receiving arms 142 and 144 are spaced apart to form a gap 146 that is configured and dimensioned to receive a pin receiving arm 166 extending from the lower half body 160, described below. The first pin receiving arm 142 has a bore 148, seen in FIG. 5, and the second pin receiving arm 144 has a bore 150. The bores 148 and 150 are configured and dimensioned to receive a pin 152. The pair of pins receiving arms 142 and 144 extending from the upper half body 136 are similar to a clevis.

Continuing to refer to FIGS. 4-7, the lower half 134 has a C-shaped body 160 defining an opening 162, a clasp holder 164 extending from a first end of the body 160 and the pin receiving arm 166 extending from a second end of the body 160. The second end of the body 160 is preferably opposite the first end of the body. It is noted that the clasp mounting bracket 139, the clasp 140 and the clasp holder 164 form a locking system that releasably locks the upper half 132 to the lower half 134.

Figure 7:
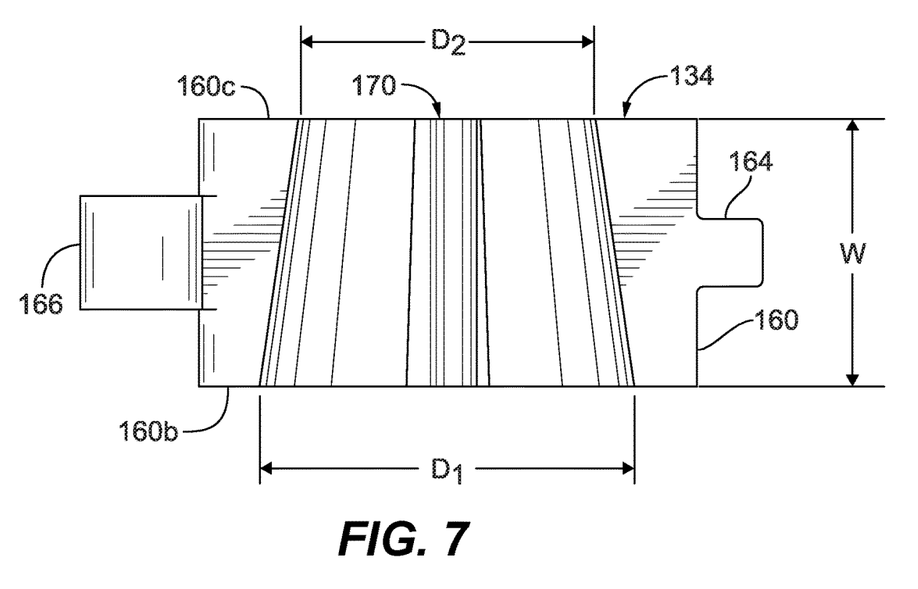
FIG. 7 is a top plan view of the base of the head portion of the tool of FIG. 5.

The lower half body 160 has a width "W" that may range from about ¾ of an inch and about 1 inch. In this exemplary embodiment, the body 160 has an arcuate shaped wall 160a forming the opening 162 with a radius that is sufficient to receive at least a portion of a cable 10 and a formed wire 32. However, the wall 160a may have other shapes, including, for example, a box-like shape. The wall 160a has a thickness that is tapered from a first side edge 160b of the lower half body 160 to a second side edge 160c of the lower half body, as shown in FIG. 7. This taper in the wall 160a alters the diameter of the opening 162. For example, the diameter "$D_1$" of the opening 162 at the first side edge 160b is preferably larger than the diameter "$D_2$" of the opening 162 at the second side edge 160c. It is noted that when the upper half body 136 of the head portion 130 is locked, e.g., clasped, to the lower half body 160, the opening 138 of the upper half body 136 and the opening 162 of the lower half body 160 form a cable receiving opening 180, seen in FIG. 4, that receives a cable 10 and formed wire 32.

Extending from the wall 160a of the lower body half 160 into the opening 162 and thus into the cable receiving opening 180 is a pusher member 170 that, when used, contacts one or more strands of the formed wire 32 and pushes the formed wire 32 around the cable 10 as the tool 100 is rotated about the cable 10 and the formed wire 32, as described below. The pusher member 170 has an extension arm 172 and a hook 174. The extension arm 172 extends from the wall 160a of the body 160 of the lower half 134 into the opening 162. The extension arm 172 may be integral with or monolithically formed into the lower half body 160, or the extension arm 172 may be attached to the wall 160a using welds, adhesives or mechanical fasteners. The hook 174 is configured and dimensioned to contact the cable 10 so that pushing wall 172a of the extension arm 172 can contact the one or more wire strands forming the formed wire 32 so that as the tool 100 is rotated about the cable 10 and formed wire 32, the pushing wall 172a of the extension arm 172 pushes the pitches of the spirals of the formed wire 32 around the cable 10 until the cable sits within the spiral of the formed wire. In the exemplary embodiment of FIGS. 4 and 5, the hook 174 is a curved edge extending from a free end of the extension arm 172. The curved edge forming the hook 174 may be an acute edge having an angle of 90 degrees or less relative to the extension arm 172, or the curved edge forming the hook 174 may be an obtuse edge have an angle having an angle that is greater than 90 degrees but less than 180 degrees relative to the extension arm 172. In other embodiments, the hook 174 may be a barb-like structure that extends from the extension arm 172. It is noted that in another embodiment, the pusher member 170 may extend from the wall 136a of the upper half body 136 into the opening 138. In such a configuration the pusher member 170 would operate the same as described above.

Continuing to refer to FIGS. 4-7, the pin receiving arm 166 is positioned on the second end of the lower half body 160 so that the pin receiving arm 166 fits within the gap 146 between the pair of pin receiving arms 142 and 144, seen in FIG. 6, so that the bores 148 and 150 align with a bore 168 in the pin receiving arm 166. The bore 168 in the pin receiving arm 166 is configured and dimensioned to receive the pin 152. In this embodiment, the pin 152 passes through the bore 148 in the first pin receiving arm 142, through the bore 168 in the pin receiving arm 166 and through the bore 150 in the second pin receiving arm 144 to form a hinge that releasably and movably attaches the upper half 132 to the lower half 134. In this embodiment, the pin receiving arm 166 is similar to a tang. The pin 152 is movably secured within the bores 148, 150 and 168 with a "C" ring 154, seen in FIG. 5.

Figure 8:
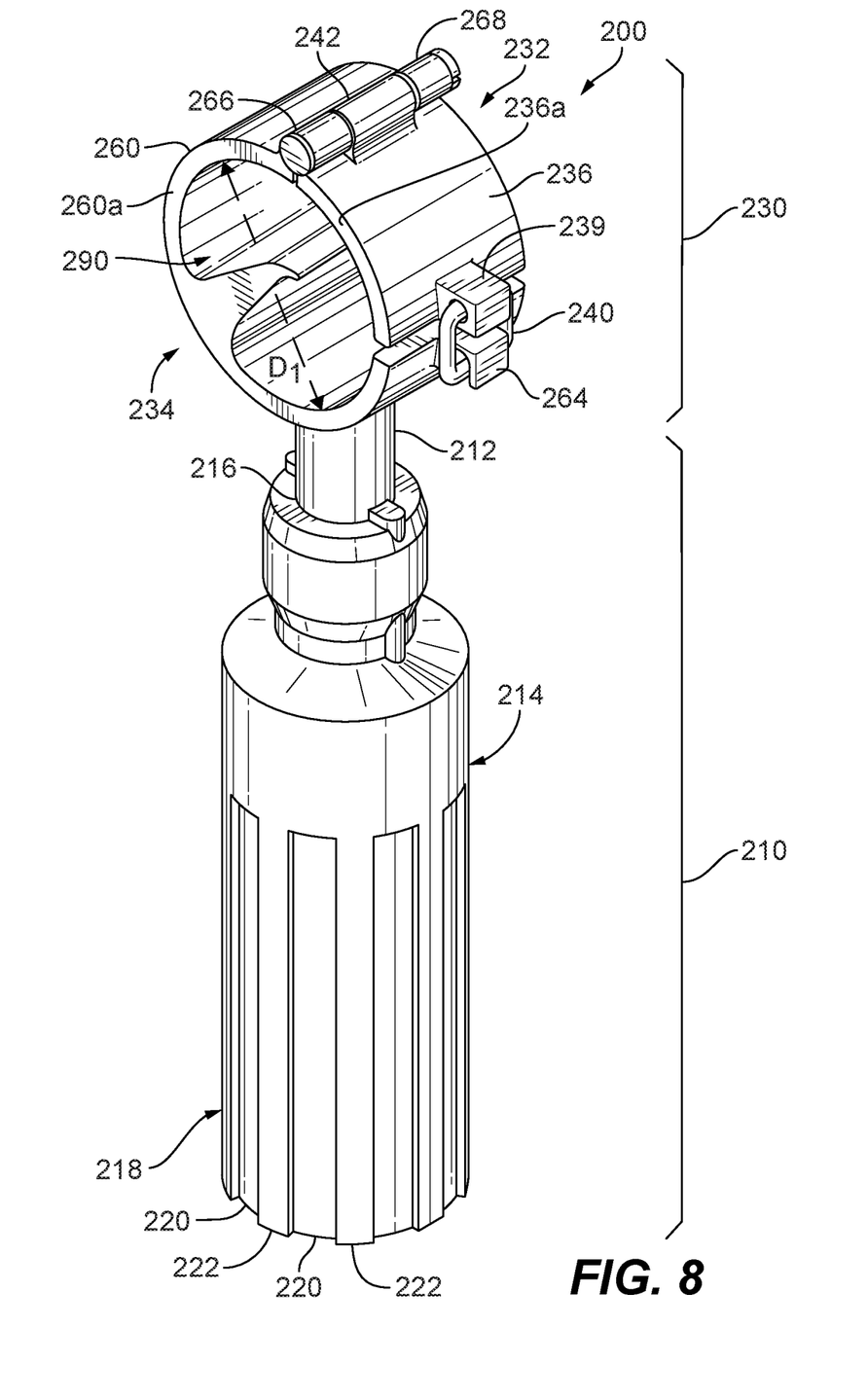
FIG. 8 is a first side perspective view of another exemplary embodiment of a tool according to the present disclosure used to wrap a formed wire around a conductor or cable.
Figure 9:
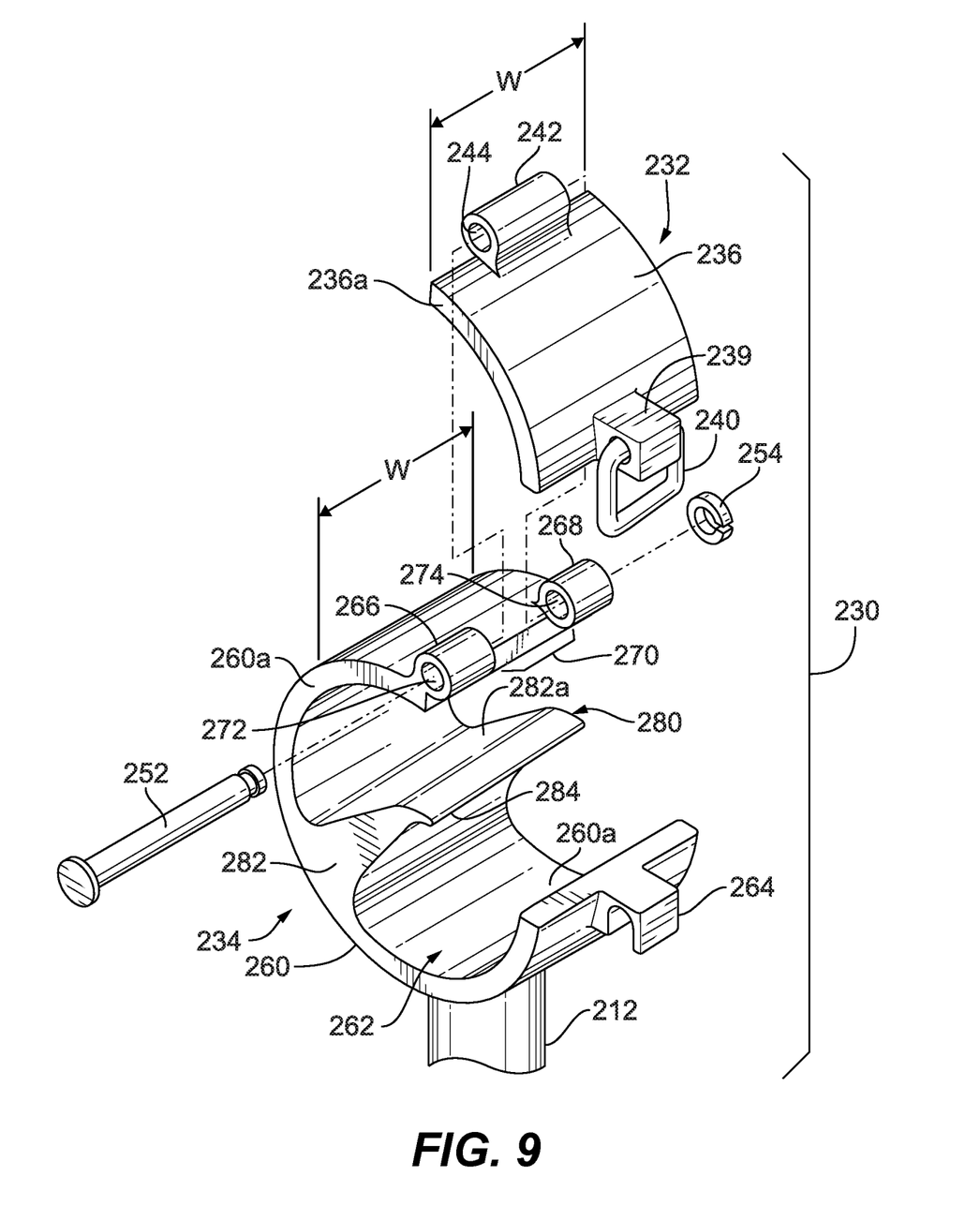
FIG. 9 is an enlarged perspective view of a head portion of the tool of FIG. 8 with parts separated, illustrating a cover releasably coupled to a base with a pin.
Figure 10:
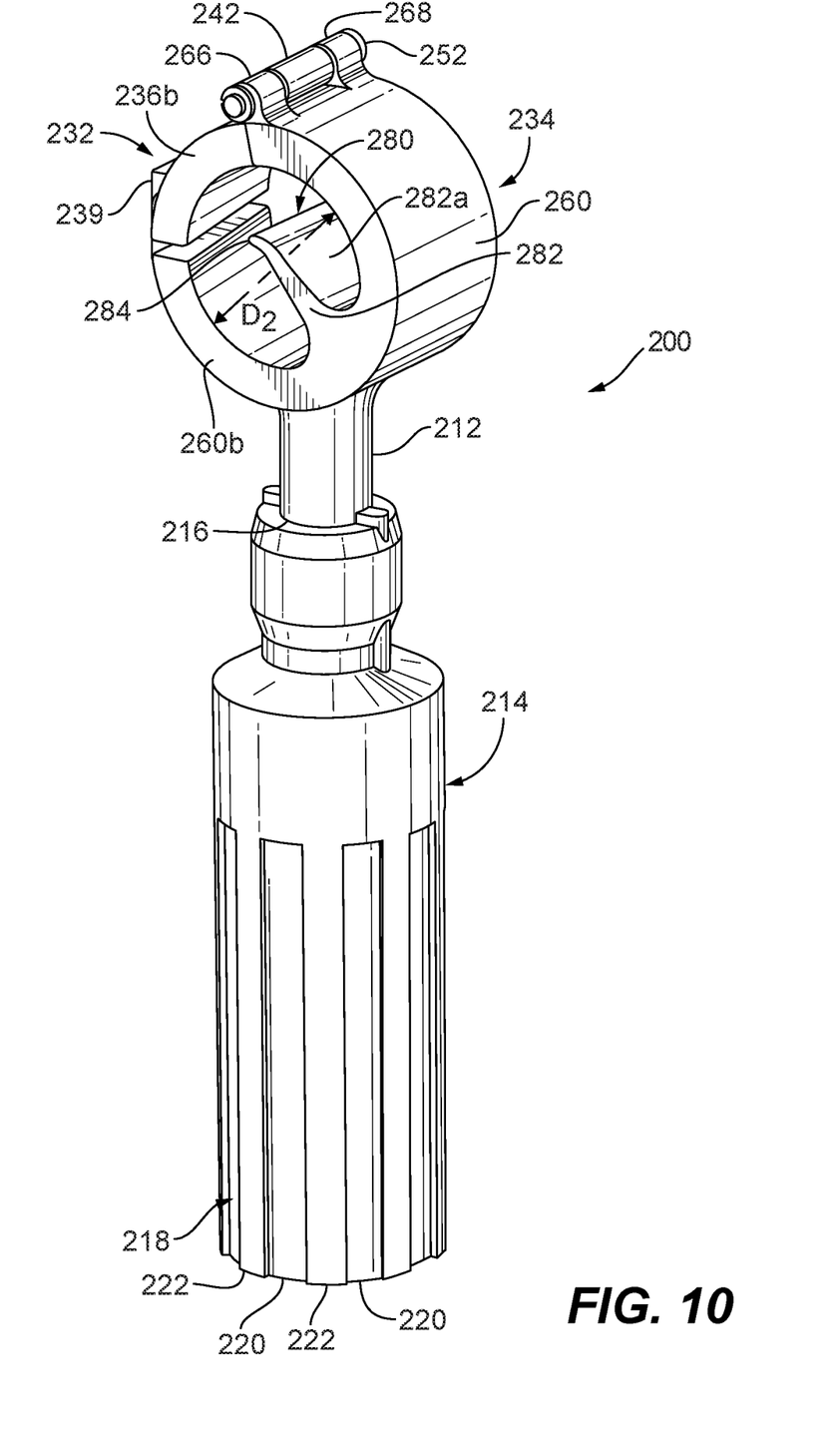
FIG. 10 is a second side perspective view of the tool of FIG. 8 used to wrap a formed wire around a conductor or cable.

Referring now to FIGS. 8-10, another exemplary embodiment of the tool according to the present disclosure is shown. In this exemplary embodiment, the tool 200 includes a handle portion 210 and a head portion 230, seen in FIG. 8. The handle portion 210 includes an elongated body 212 and a hand grip portion 214 attached to at least a portion of the elongated body 212. In this exemplary embodiment, the elongated body 212 is a cylindrical body made of a rigid material, such as metallic materials or rigid plastic materials. Non-limiting examples of metallic materials include steel, aluminum or copper. A non-limiting example of a non-metallic material includes high impact plastic, such as polypropylene, acetal, or polystyrene. However, the present disclosure contemplates that the elongated body 212 may come in any other shape, such as a square or rectangular shape. The hand grip portion 214 may also be a cylindrical body with a central bore 216 having a diameter capable of receiving at least a portion of the elongated body 212. However, the present disclosure contemplates that the hand grip portion 214 may come in any other shape with a central bore 216 having an opening capable of receiving at least a portion of the elongated body 212. The hand grip portion 214 may be attached to the elongated body 212 by a press fit, welds or using mechanical or adhesive fasteners. The hand grip portion 214 may include one or more grip enhancing members 218 provided to improve a user's grip on the tool 200 during operation. In the exemplary embodiment shown in FIGS. 8 and 10, the one or more grip enhancing members 218 include one or more elongated slots 220 extending longitudinally along at least a portion of the length of the hand grip portion 214 forming ribs 222. In other embodiments, the one or more grip enhancing members 218 may include knurling or a rubber or other tactile coating applied to the hand grip portion 214.

The head portion 230 of the tool 200 includes a cover 232 and a base 234. In this exemplary embodiment, the cover 232 has an arcuate shaped body 236, a clasp mounting bracket 239 extending from a first end of the body 236, a clasp 240 movably attached to the clasp mounting bracket 239 and a pin receiving arm 242 extending from a second end of the body 236. The second end of the body 236 is preferably opposite the first end of the body. The cover body 236 has a width "W" that may range from, for example, about ¾ of an inch and about 1 inch. The cover body 236 has a wall thickness that is tapered from a first side wall 236a, seen in FIG. 8, to a second side wall 236b of the cover body 236, seen in FIG. 10. In this exemplary embodiment, the cover body 236 has an arc length and radius that is sufficient mate with the base 234, as shown in FIG. 8, so that the cover 232 and base 234 can receive at least a portion of a cable 10 and a formed wire 32. The pin receiving arm 242 has a bore 244. The bore 244 is configured and dimensioned to receive a pin 252. The pin receiving arm 242 extending from the cover body 236 is similar to a tang.

Continuing to refer to FIGS. 8-10, the base 234 has a C-shaped body 260 defining an opening 262, a clasp holder 264 extending from a first open end of the base body 260 and a pair of pin receiving arms 266 and 268 extending from a second open end of the base body 260. It is noted that the clasp mounting bracket 239, the clasp 240 and the clasp holder 264 form a locking system that releasably locks the cover 232 to the base 234. The pin receiving arms 266 and 268 are spaced apart to form a gap 270, seen in FIG. 9, that is configured and dimensioned to receive the pin receiving arm 242 extending from the cover body 236. The first pin receiving arm 266 has a bore 272 and the second pin receiving arm 268 has a bore 274. The bores 272 and 274 are configured and dimensioned to receive the pin 252. The pair of pin receiving arms 266 and 268 extending from the base body 260 are similar to a clevis. In this embodiment, the pin 252 passes through the bore 272 in the first pin receiving arm 266, through the bore 244 in the pin receiving arm 242 and through the bore 274 in the second pin receiving arm 268 to form a hinge that releasably and movably attaches the cover 232 to the base 234. The pin 252 is movably secured within the bores 244, 272 and 274 with a "C" ring 254.

The base body 260 has a width "W" that may range from about ¾ of an inch to about 1 inch. In this exemplary embodiment, the base body 260 has an arcuate shaped wall 260a forming the opening 262 with a radius that is sufficient to receive at least a portion of a cable 10 and a formed wire 32. However, the wall 260a may have other shapes, including, for example, a box-like shape. The wall 260a of the base body 260 has a thickness that is tapered from a first side edge 260a, seen in FIG. 9, to a second side edge 260b, seen in FIG. 10 so that the diameter "$D_1$" of the opening 262, seen in FIG. 8, at the first side edge 260a is preferably larger than the diameter "$D_2$" of the opening 262 at the second side edge 260b. It is noted that when the cover body 236 is clasped to the base body 260, the opening created by the cover body 236 and the base body 260 forms a cable receiving opening 290, seen in FIG. 8, that receives a cable 10 and formed wire 32.

Extending from the wall 260a of the base body 260 into the opening 262 and thus into the cable receiving opening 290 is a pusher member 280 that, when used, contacts one or more strands of the formed wire 32 and pushes the formed wire 32 around the cable 10 as the tool 200 is rotated about the cable 10 and the formed wire 32, as described below. The pusher member 280 has an extension arm 282 and a hook 284. The extension arm 282 extends from the wall 260a of the base body 260 into the opening 262. The extension arm 282 may be integral with or monolithically formed into the base body 260, or the extension arm 282 may be attached to the wall 260a using welds, adhesives or mechanical fasteners. The hook 284 is configured and dimensioned to contact the cable 10 so that pushing wall 282a of the extension arm 282 can contact the one or more wire strands forming the formed wire 32 so that as the tool 200 is rotated about the cable 10 and formed wire 32, the pushing wall 282a of the extension arm 282 pushes the pitches of the spirals of the formed wire 32 around the cable 10 until the cable sits within the spiral of the formed wire 32. In the exemplary embodiment of FIGS. 8-10, the hook 284 is a curved edge extending from a free end of the extension arm 282. The curved edge forming the hook 284 may be an acute edge having an angle of 90 degrees or less relative to the extension arm 282, or the curved edge forming the hook 284 may be an obtuse edge have an angle having an angle that is greater than 90 degrees but less than 180 degrees relative to the extension arm 282. In other embodiments, the hook 284 may be a barb-like structure that extends from the extension arm 282.

Figure 11:
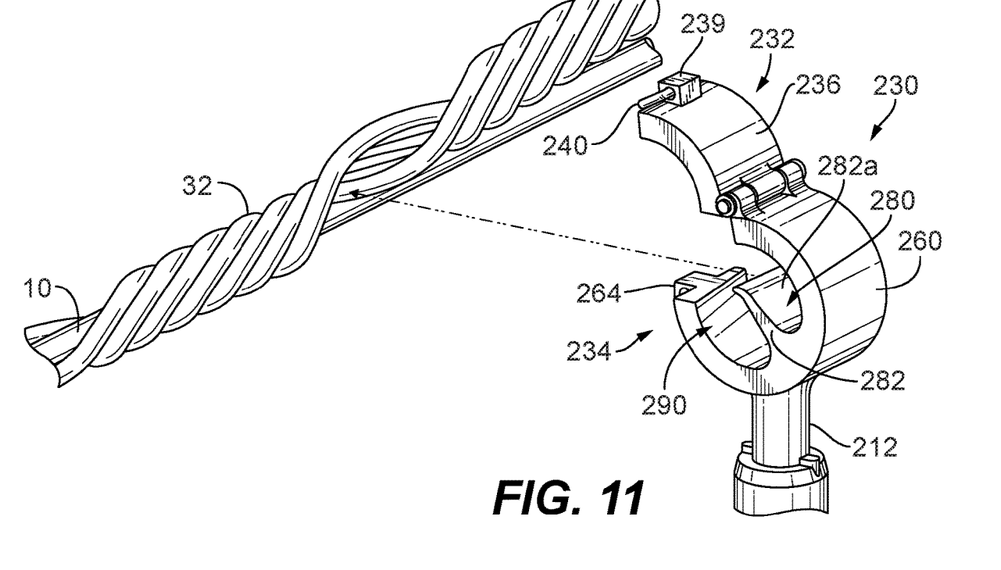
FIG. 11 is a side perspective view of the tool of FIG. 10 being positioned around a cable and a formed wire for wrapping around a formed wire around the cable.
Figure 12:
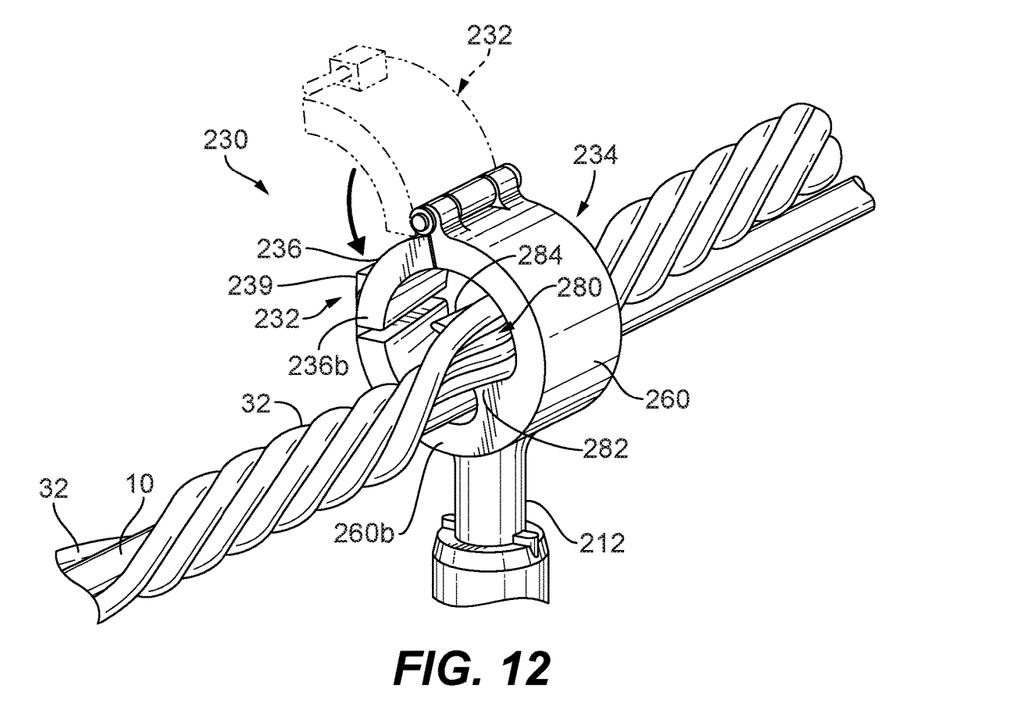
FIG. 12 is a side perspective view of the tool of FIG. 10 positioned around a cable and a formed wire, illustrating a pusher member of the tool positioned between the formed wire and the cable prior to rotating the tool.
Figure 13:
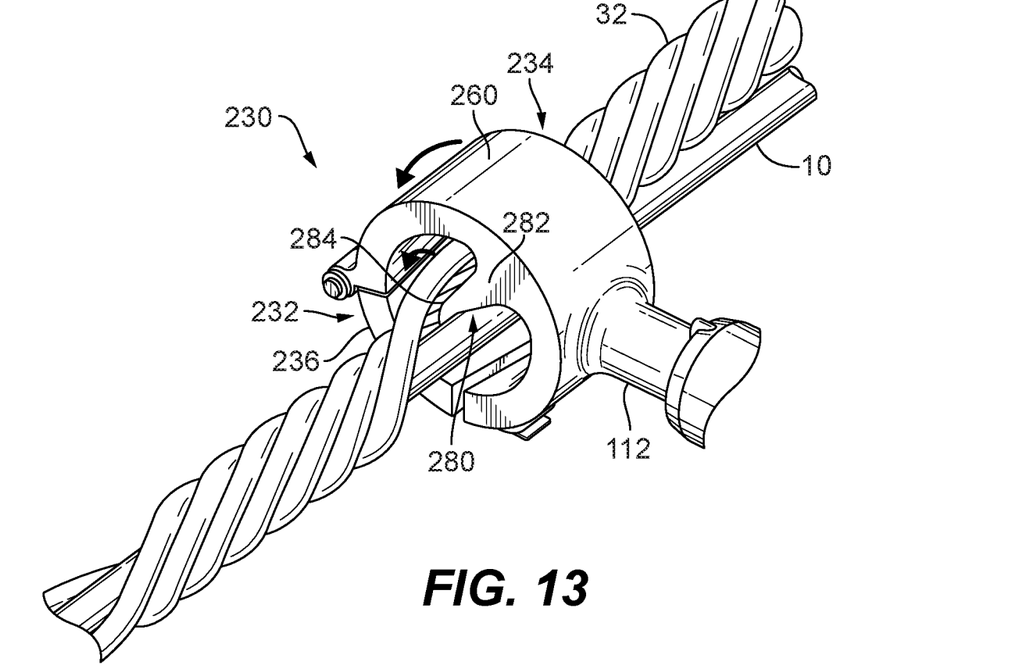
FIGS. 13-16 are side perspective views of the tool of FIG. 10 positioned around a cable and formed wire, illustrating the tool being rotated around the cable and pulling the spirals of the formed wire around the cable so that the cable sits within the spirals.
Figure 14:
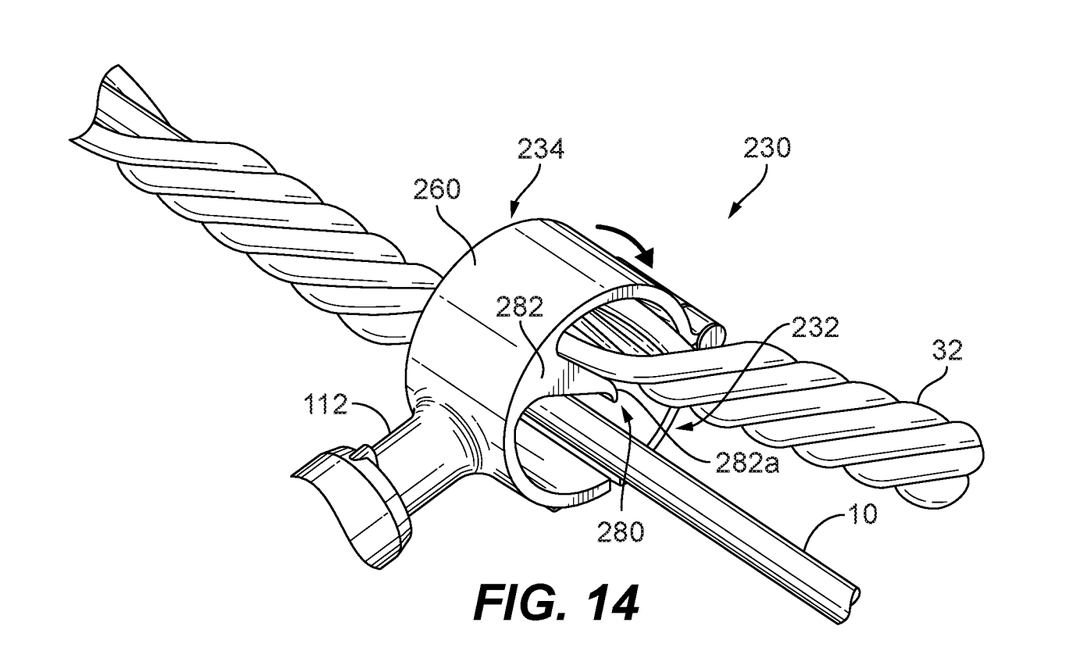
Figure 15:
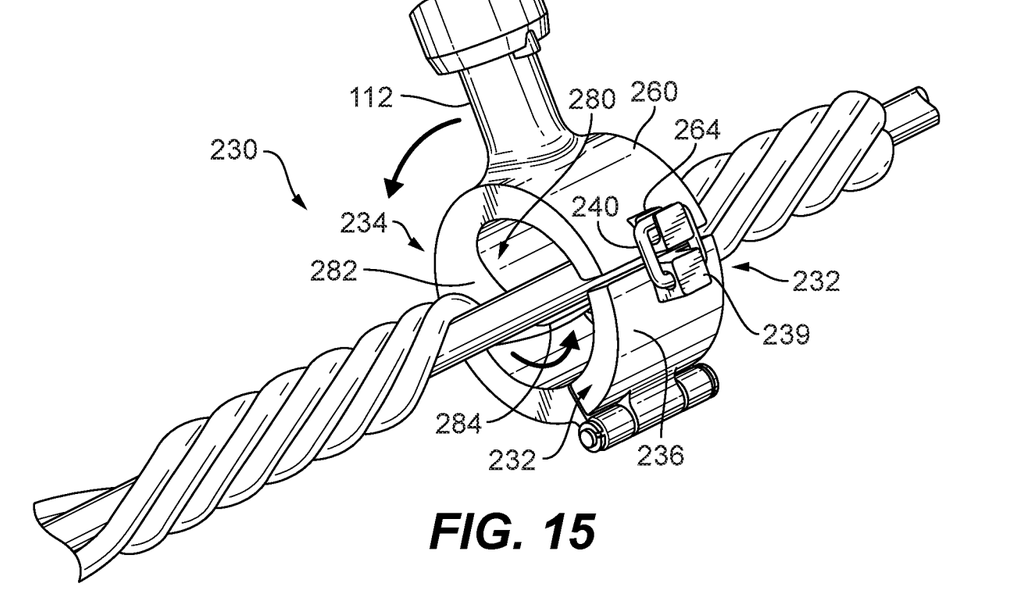
Figure 16:
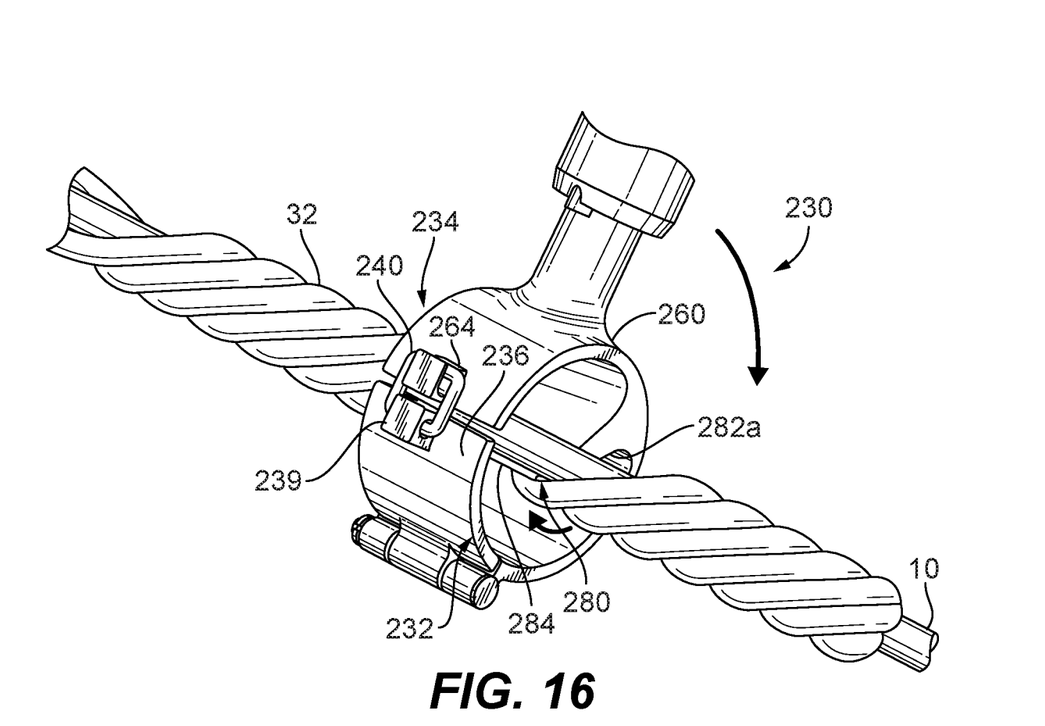

Referring now to FIGS. 11-16, the installation of a dead-end attachment 30 using the tool 200 according to the present disclosure will be described. Initially, a formed wire 32 is manually wrapped around a portion of a cable 10. The formed wire 32 is manually wrapped by taking the first leg, e.g., leg 34 or 36, of the formed wire 32 and rotating or looping the pitches of the first leg of the formed wire 32 over and around the cable 10 so that the cable 10 sits within the spirals of the first leg of the formed wire. When it becomes difficult to continue to manually rotate or loop the pitches of the first leg of the formed wire 32 over and around the cable 10, the installer releases the clasp 240 from the clasp holder 264 of the head portion 230 of the tool 200 and pivots the cover body 236 away from the base body 260. Pivoting the cover body 236 away from the base body 260 creates a gap sufficient to pass the cable 10 and formed wire 32 into the cable receiving opening 290 of the head portion 230, as seen in FIG. 11. The cover body 236 is then pivoted back toward the base body 260 and the clasp 240 is attached to the clasp holder 264 to lock the cover body 236 to the base body 260. With the cable 10 and the first leg of the formed wire 32 within the cable receiving opening 290, the hook 284 of the pusher member 280 is then positioned in proximity to and between an unwrapped pitch of the first leg of the formed wire 32 and the cable 10, seen in FIG. 12, until the hook 284 is positioned between one or more strands of the formed wire 32 and the cable 10. The tool 200 is then rotated around the cable 10 and formed wire 32 in a counter-clockwise direction, seen in FIGS. 13 and 14, so that the pushing wall 282a of the extension arm 282 begins to push the pitch of the first leg of the formed wire 32 over and around the cable 10. Further rotation of the tool 200 in the counter-clockwise direction causes the pushing wall 282a of the extension arm 282 to continue to push the pitch of the first leg of the formed wire 32 over and around the cable 10 until the cable 10 sits in the spiral of the first leg of the formed wire 32, seen in FIGS. 15 and 16. It is noted that as the tool 200 (or 100) is continuously rotated around the cable 10 and the first leg of the formed wire 32, the pusher member 280 (or 170) slides along the first leg of the formed wire 32 sequentially pushing the remaining pitches of the first leg of the formed wire 32 over and around the cable 10 until the cable 10 fully sits in the spirals of the first leg of the formed wire 32 as shown in FIG. 1.

With the first leg of the formed wire 32 wrapped around the cable 10, the second leg of the formed wire 32 is manually wrapped by rotating or looping the pitches of the second leg, e.g., leg 34 or 36, of the formed wire 32 over and around the cable 10 so that the cable sits within the spiral of the formed wire. It is noted that the second leg of the formed wire 32 is interweaved with the first leg of the formed wire to form a continuous casing around the cable 10, as shown in FIGS. 1-3. When it becomes difficult to continue to manually rotate or loop the pitches of the second leg of the formed wire 32 over and around the cable 10, the installer releases the clasp 240 from the clasp holder 264 of the head portion 230 of the tool 200 and pivots the cover body 236 away from the base body 260. Pivoting the cover body 236 away from the base body 260 creates a gap sufficient to pass the cable 10 and formed wire 32 into the cable receiving opening 290 of the head portion 230, similar to that seen in FIG. 11. The cover body 236 is then pivoted back toward the base body 260 and the clasp 240 is attached to the clasp holder 264 to lock the cover body 236 to the base body 260. With the cable 10 and the first leg of the formed wire 32 within the cable receiving opening 290, the hook 284 of the pusher member 280 is then positioned in proximity to and between an unwrapped pitch of the second leg of the formed wire 32 and the cable 10 until the hook 284 is positioned between one or more strands of the formed wire 32 and the cable 10. The tool 200 is then rotated around the cable 10 and formed wire 32 in a counter-clockwise direction so that the pushing wall 282a of the extension arm 282 begins to push the pitch of the second leg of the formed wire 32 over and around the cable 10. Further rotation of the tool 200 in the counter-clockwise direction causes the pushing wall 282a of the extension arm 282 to continue to push the pitch of the second leg of the formed wire 32 over and around the cable 10 until the cable 10 sits in the spiral of the second leg of the formed wire 32. It is again noted that as the tool 200 (or 100) is continuously rotated around the cable 10 and the second leg of the formed wire 32, the pusher member 280 (or 170) slides along the second leg of the formed wire 32 sequentially pushing the remaining pitches of the second leg of the formed wire 32 over and around the cable 10 until the cable 10 fully sits in the spirals of the second leg of the formed wire 32, as shown in FIG. 1.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A tool for wrapping a formed wire around a cable, the tool comprising:
    a handle portion having an elongated body and a hand grip portion attached to at least a portion of the elongated body; and
    a head portion having:
        a base attached to the elongated body of the handle portion and having a pusher member, the base having a wall forming an opening and the pusher member having an extension arm extending from the wall into the opening and a hook at an end of the extension arm;
        a cover removably coupled to the base by a pin, the pin forming a pivot point between the cover and the base such that the cover is movable relative to the base; and
        a locking system adapted to releasably hold the cover to the base.

2. The tool according to claim 1, wherein the locking system comprises a clasp on the cover and a clasp holder on the base adapted to receive the clasp and releasably hold the clasp.

3. The tool according to claim 1, wherein the elongated body of the handle portion is a cylindrical body.

4. The tool according to claim 1, wherein the hand grip portion of the handle portion comprises at least one grip enhancing member.

5. The tool according to claim 4, wherein the at least one grip enhancing member comprises at least one slot extending longitudinally along at least a portion of a length of the hand grip portion.

6. The tool according to claim 1, wherein the extension arm is monolithically formed into the base.

7. The tool according to claim 6, wherein the hook comprises a curved edge.

8. The tool according to claim 7, wherein the curved edge comprises an acute edge or an obtuse edge.

9. A tool for wrapping a formed wire around a cable, the tool comprising:
    a handle portion having an elongated body and a hand grip portion attached to at least a portion of the elongated body;
    a head portion including a cover having an interior wall pivotably attached to a base having an interior wall, such that when the cover is pivoted into contact with the base a cable receiving opening is formed between the interior wall of the cover and the interior wall of the base; and
    a pusher member having an extension arm extending from the interior wall of the cover or the interior wall of the base into the cable receiving opening and a hook at an end of the extension arm.

10. The tool according to claim 9, wherein the head portion further comprises a locking system adapted to releasably hold the cover to the base.

11. The tool according to claim 10, wherein the locking system comprises a clasp on the cover and a clasp holder on the base adapted to receive the clasp and releasably hold the clasp.

12. The tool according to claim 9, wherein the elongated body of the handle portion is a cylindrical body.

13. The tool according to claim 9, wherein the hand grip portion of the handle portion comprises at least one grip enhancing member.

14. The tool according to claim 13, wherein the at least one grip enhancing member comprises at least one slot extending longitudinally along at least a portion of a length of the hand grip portion.

15. The tool according to claim 9, wherein the extension arm is monolithically formed into the cover or base.

16. The tool according to claim 15, wherein the hook comprises a curved edge.

17. The tool according to claim 16, wherein the curved edge comprises an acute edge or an obtuse edge.

18. A tool for wrapping a formed wire around a cable, the tool comprising:
    a handle portion having an elongated body and a hand grip portion attached to at least a portion of the elongated body; and a head portion having:
- a base attached to the elongated body of the handle portion, the base having an interior wall;
- a cover coupled to the base so that the cover is movable relative to the base, the cover having an interior wall; and
- a locking system used to releasably hold the cover in a closed position relative to the base;
- wherein the base or the cover includes a pusher member having an extension arm extending from the interior wall of the cover or the interior wall of the base into the cable receiving opening and a hook at an end of the extension arm.

19. The tool according to claim 18, wherein the locking system comprises a clasp on the cover and a clasp holder on the base adapted to receive the clasp and releasably hold the clasp.

20. The tool according to claim 18, wherein the elongated body of the handle portion is a cylindrical body.

21. The tool according to claim 18, wherein the hand grip portion of the handle portion comprises at least one grip enhancing member.

22. The tool according to claim 21, wherein the at least one grip enhancing member comprises at least one slot extending longitudinally along at least a portion of a length of the hand grip portion.

23. The tool according to claim 18, wherein the extension arm is monolithically formed into the cover or base.

24. The tool according to claim 23, wherein the hook comprises a curved edge.

25. The tool according to claim 24, wherein the curved edge comprises an acute edge or an obtuse edge.

* * * * *